United States Patent
Allen et al.

(10) Patent No.: US 10,031,938 B2
(45) Date of Patent: Jul. 24, 2018

(54) DETERMINING BOOLEAN LOGIC AND OPERATOR PRECEDENCE OF QUERY CONDITIONS

(75) Inventors: Thomas Bradley Allen, Henderson, NV (US); Keith Caceres, Las Vegas, NV (US); Michael Henry D'Amico, Las Vegas, NV (US); Brand Lee Hunt, Las Vegas, NV (US); Kathleen Miyoko Nojima, Henderson, NV (US); Maria Nichole Schwenger, Henderson, NV (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1872 days.

(21) Appl. No.: 11/566,492

(22) Filed: Dec. 4, 2006

(65) Prior Publication Data

US 2008/0133570 A1 Jun. 5, 2008

(51) Int. Cl.
*G06F 17/30* (2006.01)

(52) U.S. Cl.
CPC .. *G06F 17/30398* (2013.01); *G06F 17/30392* (2013.01)

(58) Field of Classification Search
CPC ............... G06F 17/30398; G06F 17/30392
See application file for complete search history.

(56) References Cited

U.S. PATENT DOCUMENTS

| | | | |
|---|---|---|---|
| 5,412,807 A | 5/1995 | Moreland | |
| 5,664,172 A * | 9/1997 | Antoshenkov | ............ 707/4 |
| 5,884,304 A | 3/1999 | Davis, III et al. | |
| 5,924,089 A | 7/1999 | Mocek et al. | |
| 5,950,190 A | 9/1999 | Yeager et al. | |
| 6,035,311 A | 3/2000 | McCool et al. | |
| 6,111,574 A | 8/2000 | Meek | |
| 6,430,552 B1 | 8/2002 | Corston-Oliver | |
| 6,453,312 B1 | 9/2002 | Goiffon et al. | |
| 6,658,407 B1 * | 12/2003 | Bailey | |
| 6,748,377 B1 | 6/2004 | Attaluri | |
| 6,768,997 B2 | 7/2004 | Schirmer et al. | |
| 6,915,290 B2 | 7/2005 | Bestgen et al. | |
| 6,947,934 B1 | 9/2005 | Chen et al. | |

(Continued)

FOREIGN PATENT DOCUMENTS

| | | |
|---|---|---|
| JP | 10134078 | 5/1998 |
| JP | 11102375 | 4/1999 |
| JP | 2006155663 | 6/2006 |

OTHER PUBLICATIONS

G. Salton et al. "Automatic Query Formulations in Information Retrieval." Journal of the American Society for Information Science. Jul. 1983 vol. 34(4): pp. 262-280.

(Continued)

*Primary Examiner* — Paul Kim
(74) *Attorney, Agent, or Firm* — Patterson + Sheridan, LLP (57) ABSTRACT

The present invention generally is directed to a system, method and article of constructing queries from a set of query conditions. The query conditions are grouped using logical operators to generate a database query. Query conditions within a group may be connected using a logical "OR" operator and groups of query conditions may be connected using a logical "AND" operator. Once generated, the database query may be presented to a user for review.

21 Claims, 8 Drawing Sheets

(56) References Cited

U.S. PATENT DOCUMENTS

| | | | |
|---|---|---|---|
| 7,730,053 B2* | 6/2010 | Sauermann | G06F 17/30469 707/713 |
| 8,229,940 B2 | 7/2012 | Allen et al. | |
| 2002/0059297 A1 | 5/2002 | Schirmer et al. | |
| 2002/0123984 A1 | 9/2002 | Prakash | |
| 2003/0120682 A1 | 6/2003 | Bestgen et al. | |
| 2003/0163455 A1 | 8/2003 | Dettinger et al. | |
| 2004/0068489 A1 | 4/2004 | Dettinger et al. | |
| 2004/0139060 A1 | 7/2004 | Maxwell | |
| 2004/0172520 A1 | 9/2004 | Smit et al. | |
| 2004/0215638 A1 | 10/2004 | Kapoor et al. | |
| 2005/0004911 A1* | 1/2005 | Goldberg et al. | 707/7 |
| 2005/0071326 A1 | 3/2005 | Brown et al. | |
| 2005/0192940 A1 | 9/2005 | Morris | |
| 2005/0228768 A1 | 10/2005 | Thusoo et al. | |
| 2005/0278306 A1 | 12/2005 | Dettinger et al. | |
| 2006/0100989 A1 | 5/2006 | Chinchwadkar et al. | |
| 2006/0116999 A1 | 6/2006 | Dettinger et al. | |
| 2006/0195427 A1 | 8/2006 | Kilroy | |
| 2006/0277157 A1 | 12/2006 | Seidl et al. | |
| 2007/0027845 A1 | 2/2007 | Dettinger et al. | |
| 2007/0073657 A1 | 3/2007 | Santosuosso | |
| 2007/0112727 A1 | 5/2007 | Jardine et al. | |
| 2007/0266017 A1 | 11/2007 | Held et al. | |
| 2008/0133570 A1 | 6/2008 | Allen et al. | |
| 2010/0161646 A1 | 6/2010 | Ceballos et al. | |

OTHER PUBLICATIONS

G. Salton et al. "A Comparison of Two Methods for Boolean Query Relevancy Feedback." Information Processing & Management. 1984 vol. 20(5/6): pp. 637-651.

G. Salton et al. "A Simple Blueprint for Automatic Boolean Query Processing." Information Processing & Management. 1988 vol. 24(3): pp. 269-280.

Fosca Giannotti et al. "Specifying Mining Algorithms with Iterative User-Defined Aggregates." IEEE Transactions on Knowledge and Data Engineering. Oct. 2004 vol. 16(10): pp. 1232-1246.

Sherman, C., (Exec. Ed.), "Search Engine Watch: In Praise of Fuzzy Searching", Jul. 6, 2001, 2 pp.

* cited by examiner

| Query Conditions | | |
|---|---|---|
| Attribute: ▷ | First name: | John |
| First name | | |
| Attribute: ▷ | First name: | Jane |
| First name | | |
| Attribute: ▷ | Last name: | Doe |
| Last name | | |
| Attribute: ▷ | ZIP code: | 89128 |
| ZIP code | | |

Show summary | Find | Reset | Add Condition

Query Conditions

| Attribute: | First name: |
|---|---|
| First name ▷ | John |

| Attribute: | First name: |
|---|---|
| First name ▷ | Jane |

| Attribute: | Last name: |
|---|---|
| Last name ▷ | Doe |

| Attribute: | ZIP code: |
|---|---|
| ZIP code ▷ | 89128 |

| Attribute: | ZIP code: |
|---|---|
| ZIP code ▷ | 89129 |

[ Show summary ] [ Find ] [ Reset ] [ Add Condition ]

Query Conditions

Attribute: First name
First name: John

Attribute: First name
First name: Jane

Attribute: Last name
Last name: Doe

Attribute: ZIP code
ZIP code: 89128

Attribute: ZIP code
ZIP code: 89129

Attribute: Phone area code
Area code: 702

[Show summary] [Find] [Reset] [Add Condition]

DETERMINING BOOLEAN LOGIC AND OPERATOR PRECEDENCE OF QUERY CONDITIONS

BACKGROUND OF THE INVENTION

Field of the Invention

Embodiments of the present invention generally relate to data processing. More specifically, embodiments of the invention relate to a method for automatically determining Boolean logic and operator precedence of query conditions for users composing a database query.

Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Database queries are composed using a query language. Currently, the most commonly used database query language is SQL, short for Structured Query Language. The term "query" refers to a set of commands for retrieving data from a stored database. A database query provides a specific set of instructions for extracting particular data from a database. Typically, a query specifies conditions that data elements in the database should satisfy in order to be returned as part of a query result. Groups of conditions are evaluated using logical operators (e.g., OR, AND, etc.) according to a set of rules defining operator precedence. Precedence is a property of an operator that is used to specify its order of evaluation relative to other operators included within the database query. Operators with higher precedence are evaluated before those with lower precedence. Precedence rules may be implicitly used to evaluate an unstructured query. Alternatively, an order of evaluation may be may be expressly specified by a database query, typically by enclosing a condition within parentheses.

Constructing a query in a query language such as SQL typically requires at least some level of technical expertise. As such, queries are usually composed by technically proficient persons, such as programmers. However, in certain situations, it may be useful to enable a non-technical user (i.e., not a programmer or database administrator) to compose and execute database queries. For example, a customer service representative may need to query a customer database to retrieve information about customers that live in a given city. In another example, a company web site may allow consumers to interactively query a product catalog. In such situations, the users have a need to query the database, but may lack the expertise required to compose a database query correctly.

To enable a non-technical user to compose a database query, application programs often provide users with a simplified query interface. Frequently, such an interface allows a non-technical user to compose a query by specifying one or more query conditions. A query condition includes a database field (also referred to as an attribute) and a value for that attribute used to include (or exclude) a data record from query results. The database attribute may specify a column in a table of a relational database. For example, records in a customer database could include the data attributes of "First name," "Last name," "Address," "Phone number," etc. Each record (i.e., row) in this table stores information related to a different customer and may specify a value for one or more attributes of the table. A non-technical user may use a query interface to specify a query condition having attribute "Phone number" and condition value "555-1234." Executing this query would return only those database records having the value "555-1234" in the "Phone number" field. This query can be represented as:

Select all where:
(Phone number = "555-1234")

In some situations, a user may have a need to perform a query with more than one query condition. For example, a user may need to determine the customers that have first name "John" and last name "Doe." In such situations, query interfaces have allowed users to specify multiple query conditions. Typically, such query interfaces force the user to select between the options of "All conditions" or "Any conditions." If the user chooses "All conditions," the query will be constructed so that each record of the resulting data set has to individually meet every specified condition. In this example, selecting "All conditions" would result in a data set comprising the customers having both a first name "John" and a last name "Doe." Thus, customers in the resulting data set will be named "John Doe." In contrast, if the user selects "Any conditions," the query will return any records that meet one or more query conditions. Thus, if the user in the previous example had selected "Any conditions," the resulting data set will comprise any customers having first name "John" along with any customers having last name "Doe." In this case, the result could include customers named "John Doe," "John Smith", "Jane Doe", "John Jones", "Richard Doe," etc.

However, in some situations, a user may wish to compose a query with multiple query conditions in more complex combinations than are allowed using the "All conditions" or "Any conditions" options. As is known, a common technique for constructing complex queries is Boolean logic. In Boolean logic, the various query conditions are joined by logical operators (e.g., AND, OR, etc.). Query interfaces are known in the art that permit a user to construct a query by selecting a first query condition (e.g., First name="John"), then selecting a logical operator (e.g., AND), and then selecting a second query condition (e.g., Last name="Doe"). This process can then be repeated to achieve the desired query.

For example, Boolean logical operators can be illustrated in a case in which a user wishes to compose a query to identify all customers 40 years of age and all customers having an age of 50 years. To perform this action, a user could construct a query by selecting "Age" from an attribute drop-down menu, specifying a value of 40, selecting a Boolean logical operator "OR" from a drop-down menu, then selecting "Age" from an attribute drop-down menu, and then specifying a value of 50. The resulting query is:

Select all where:
(Age = 40) OR (Age = 50)

However, as even this simple example illustrates, the use of Boolean expressions often results in confusion for non-technical users. In some cases, the language of a Boolean expression can appear to be similar to a "plain English"

expression with a different meaning, and may cause a user to make erroneous assumptions. In the previous example, a user wishes to identify all customers 40 years of age as well as customers 50 years of age. In this situation, a non-technical user of a query interface will often mistakenly select the logical operator "AND" rather than "OR," since he may state colloquially that he requires data for the customers aged 40 years and the customers aged 50 years. If this occurs, the resulting query is:

Select all where:
(Age = 40) AND (Age = 50)

However, this query will return a data set comprising the records of all customers who individually have both the age of 40 years and the age of 50 years. Obviously, most customer databases will only accommodate a single value for the "Age" attribute of a customer record. Therefore, since no single customer can meet the query conditions specified, this query does not return any query results, which may lead the user to conclude that there are simply no records in the database for a customers that are either 40 years of age or 50 years of age. Similarly, non-technical users will often mistakenly construct queries with logical operator "OR" in situations that properly require the use of logical operator "AND."

Beyond problems in selecting the proper logical operators, non-technical users can also become confused in properly structuring multiple query conditions. When multiple query conditions are required, the logical operators and the query conditions must be ordered and grouped to establish the proper logical precedence to extract the desired set of data. Sometimes, implicit rules of operator precedence will coincide with the grouping desired by a user. However, frequently, they will not. Because of these complexities, it is common for non-technical users to incorrectly structure the logical operators and the query conditions in queries.

For the above reasons, query interfaces existing in the prior art can lead to error and confusion for non-technical users. Accordingly, there is a need for a method for automatically determining Boolean logic and operator precedence of query conditions.

SUMMARY OF THE INVENTION

Embodiments of the invention include a computer-implemented method for generating a database query. The method generally includes receiving a collection of query conditions to include in the database query. Each query condition may specify a database field and a comparison value. The method also includes identifying one or more groups of query conditions, where each group includes query conditions specifying the same database field. The database query may be generated by connecting the query conditions within each identified group using a logical "OR" operator, and connecting the identified groups of query conditions using a logical "AND" operator.

Embodiments of the invention also include a computer-readable storage medium containing a program which, when executed, performs an operation for generating a database query. The operation generally includes receiving a collection of query conditions to include in the database query. Each query condition may specify a database field and a comparison value. The operation also includes identifying one or more groups of query conditions, where each group includes query conditions specifying the same database field. The program generates the database query by connecting the query conditions within each identified group using a logical "OR" operator, and connecting the identified groups of query conditions using a logical "AND" operator.

Embodiments of the invention also include a computing device having a processor and a memory containing a program configured to generate a database query. The program may be generally configured to receive a collection of query conditions to include in the database query, where each query condition specifies a database field and a comparison value. In response, the program may be configured to identify one or more groups of query conditions, wherein each group includes query conditions specifying the same database fields, and to generate the database query by connecting the query conditions within each identified group using a logical "OR" operator, and connecting the identified groups of query conditions using a logical "AND" operator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally provide a system, method and article of manufacture for building database queries that include multiple query conditions. Generally, a user interface allows a user to specify multiple query conditions to include in a database query. The query conditions may be used to compose a database query, where the Boolean logic used to connect the multiple query conditions satisfy the requirements for a majority of queries. Doing so enables non-technical users (i.e., users lacking training in query languages) to compose more complex database queries then are available using an "any conditions" or "all conditions" paradigm.

In one embodiment, a query tool may be configured to allow a user to enter query conditions. The query tool may be further configured to automatically connect the query conditions on behalf of the user. The user may be presented with a query summary in order to confirm that the query is properly constructed, and allow the user to make any necessary corrections.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media on which information is permanently stored (e.g., read-only memory devices within a computer such as CD-ROM or DVD-ROM disks readable by a CD- or DVD-ROM drive); (ii) writable storage media on which alterable information is stored (e.g., floppy disks within a diskette drive, hard-disk drives, or flash memory devices). Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
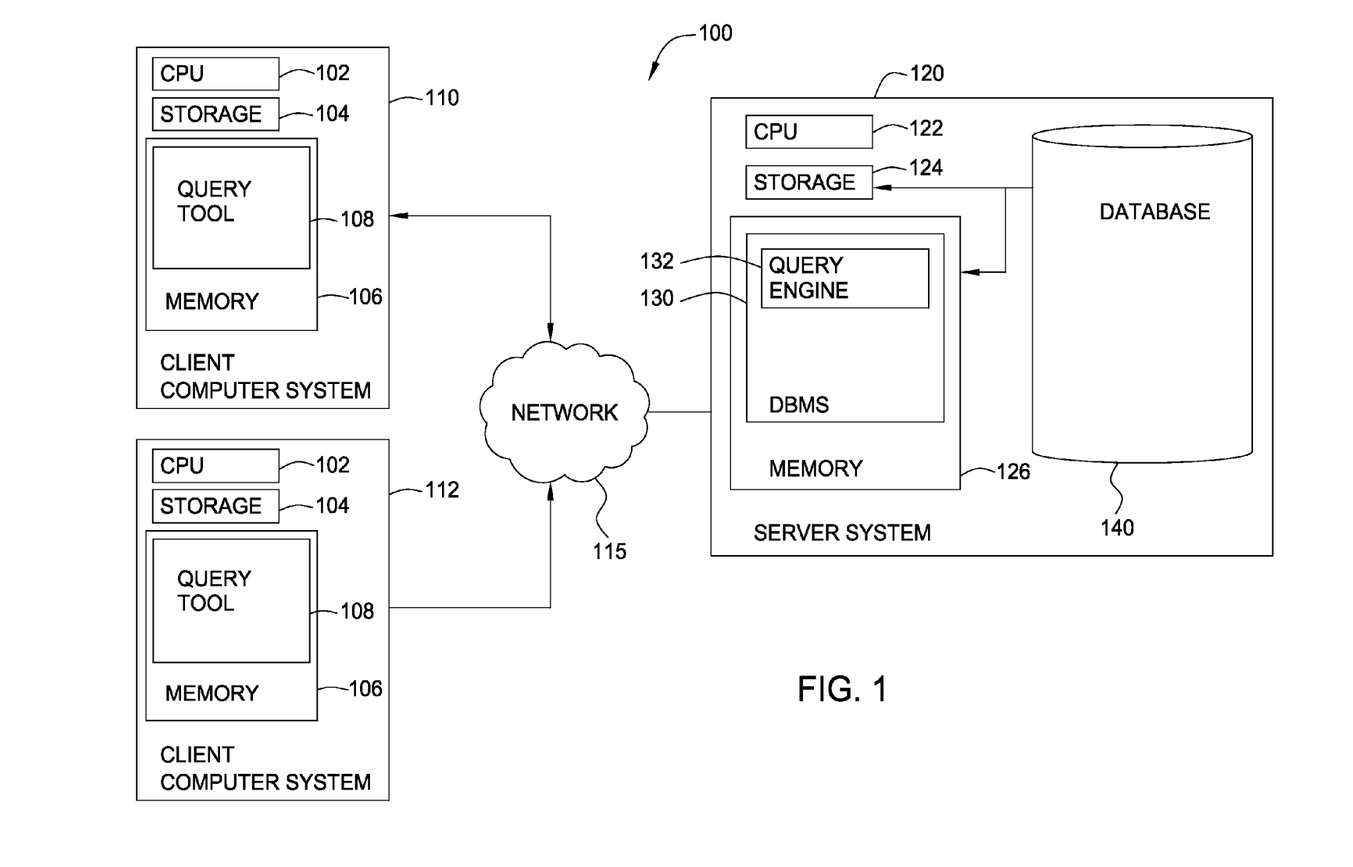
FIG. 1 illustrates a computer system configured in accordance with the present invention.

FIG. 1 is a block diagram that illustrates a client server view of a computing environment 100, according to one embodiment of the invention. As shown, computing environment 100 includes two client computer systems 110 and 112, a network 115 and a server system 120. The computer systems illustrated in environment 100 are included to be representative of existing computer systems, e.g., desktop computers, server computers laptop computers, tablet computers and the like. However, embodiments of the invention are not limited to any particular computing system, application or network architecture and may be adapted to take advantage of new computing systems as they become available. Additionally, those skilled in the art will recognize that the computer systems illustrated in FIG. 1 are simplified to highlight aspects of the present invention and that computing systems and networks typically include a variety of additional elements not shown in FIG. 1.

Client computer systems 110 and 112 each include a CPU 102, storage 104 and memory 106, typically connected by a bus (not shown). CPU 102 is a programmable logic device that performs all the instructions and logic processing performed in executing user applications. Storage 104 stores application programs and data for use by client computer systems 110 and 112. Storage 104 includes hard-disk drives, flash memory devices, optical media and the like. Network 115 generally represents any kind of data communications network. Accordingly, network 115 may represent both local and wide area networks, including the Internet. Client computer systems 110 and 112 can run a query tool 108.

Server system 120 includes a CPU 122, storage 124 and memory 126. Storage 124 also includes a database 140. In one embodiment, query tool 108 may allow a user to compose a database query, where query tool 108 is configured to automatically determine Boolean logic and operator precedence of query conditions included in the query. Additionally, query tool 108 may be configured to transmit a query over network 115 to server system 120 for execution by a database management system (DBMS). DBMS 130 is a software application configured to manipulate the information in database 140. Thus, DBMS 130 may be configured to add, delete, modify, sort, display and search for specific information stored in database 140. Illustratively, DBMS 130 includes a query engine 132. The query engine 132 represents the instructions or routines included in DBMS 130 that evaluate logical operators and query conditions, according to a set of operator precedence rules.

In one embodiment, the query tool 108 generates a database query from a collection of user-specified query conditions. The queries generated by query tool 108 are used to retrieve data from database 140. However, query tool 108 does not require the user to specify any Boolean logical operators or to determine the order and precedence used by DBMS 130 and query engine 132 to evaluate the query conditions. One embodiment of query tool 108 is described with reference to FIGS. 3A-3G, which illustrate an interface being used to specify a set of query conditions to include in a database query, along with the database query that would result as each additional condition is specified.

Once the user has completed specifying a collection of query conditions, query tool 108 may be configured to produce a proposed query solution. In one embodiment, query tool 108 automatically determines one or more Boolean logical operators to include in a proposed query solution, as well as the order in which logical operators are to be evaluated. Query tool 108 groups and orders the query conditions into one or more groups for the proposed query solution. The proposed query solution is structured to use the correct logical operators and precedence required in the majority of cases.

Figure 2:
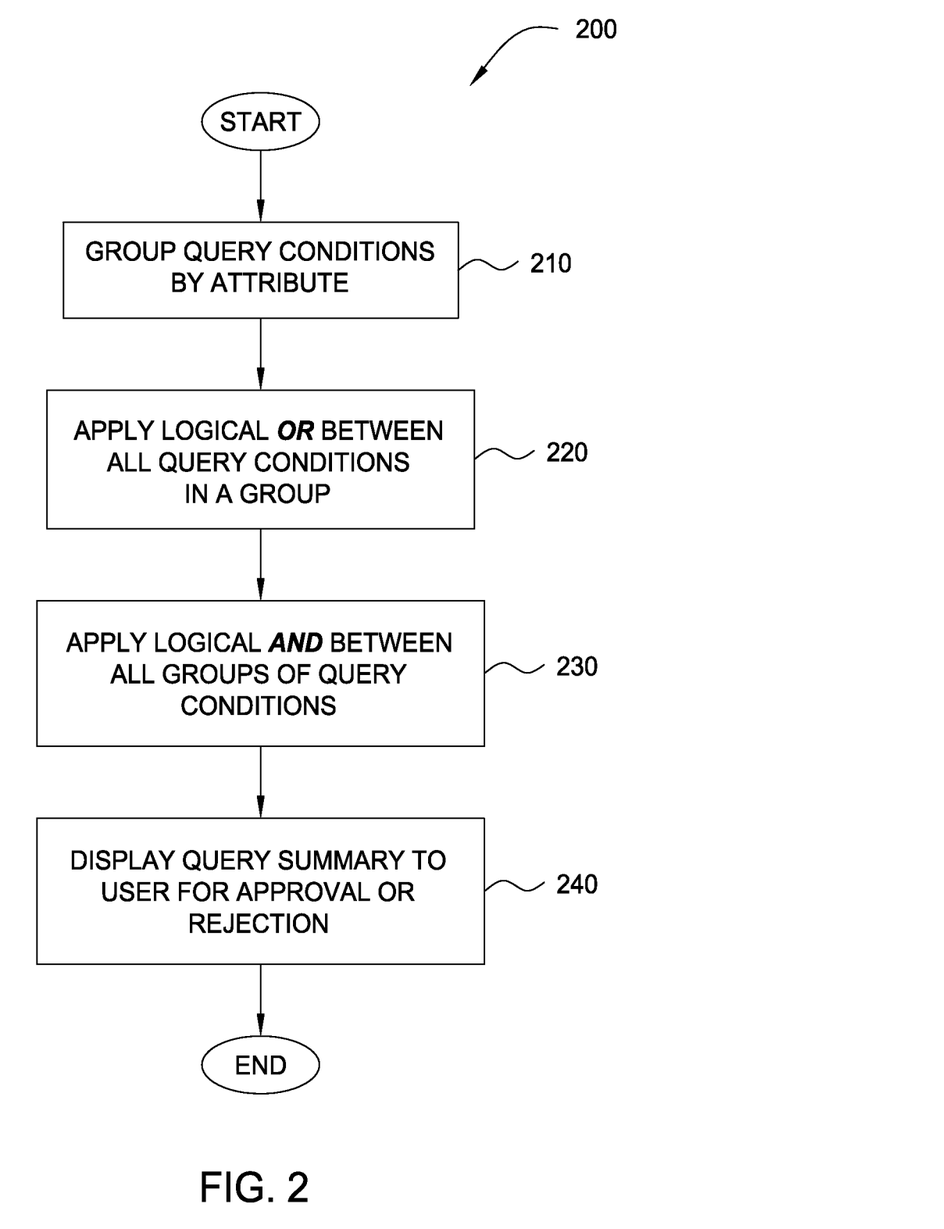
FIG. 2 illustrates a method for automatically determining Boolean operators and operator precedence to connect a set of user-specified query conditions, according to one embodiment of the invention.

FIG. 2 illustrates a method 200 for automatically determining Boolean operators and operator precedence of query conditions, according to one embodiment of the invention. Query tool 108 may be configured to build a query from query conditions specified by the user according to method to the steps of method 200. However, persons skilled in the art will understand that any system configured to perform method 200, in any order, is within the scope of the invention.

The method 200 begins at step 210, where the query conditions are grouped by attribute. That is, query conditions which reference the same database field are grouped together. A query condition may reference a database field and specify a conditional value for that field. The conditional value specifies a value to use in selecting records from the database. As described above, a database attribute may correspond with a data field in tables of a relational database. Some examples of fields are "First name," "Age," "City," etc., and examples of conditional values for these fields include "Mark," "35," and "Palo Alto."

At step 220, the logical operator "OR" is used to join each query condition in a group. For example, a user may interact with query tool 108 to specify a query condition of "City=Austin" and also specify a query condition of "City=San Jose." Both of these query conditions specify the same "City" attribute, and thus, results in the addition of the operator "OR" between these query conditions." This result is shown in the following query:

```
Select all where:
(City = "Austin" OR City = "San Jose")
```

At step 230, the logical operator "AND" is used to join different groups of query conditions. For example, a user may interact with query tool 108 to specify a query condition of "City=Austin" and may also specify a query condition of "First name=John." Because the conditions specify different attributes (i.e., different database fields) query adds the operator "AND" between the "City" condition and the "First name" condition. This result is shown in the following query:

```
Select all where:
(City = "Austin")
AND
(First name = "John")
```

At step 240, the proposed query is displayed to the user in summary form. The method 200 is further described below with reference to FIGS. 3A-G.

Figure 3A:
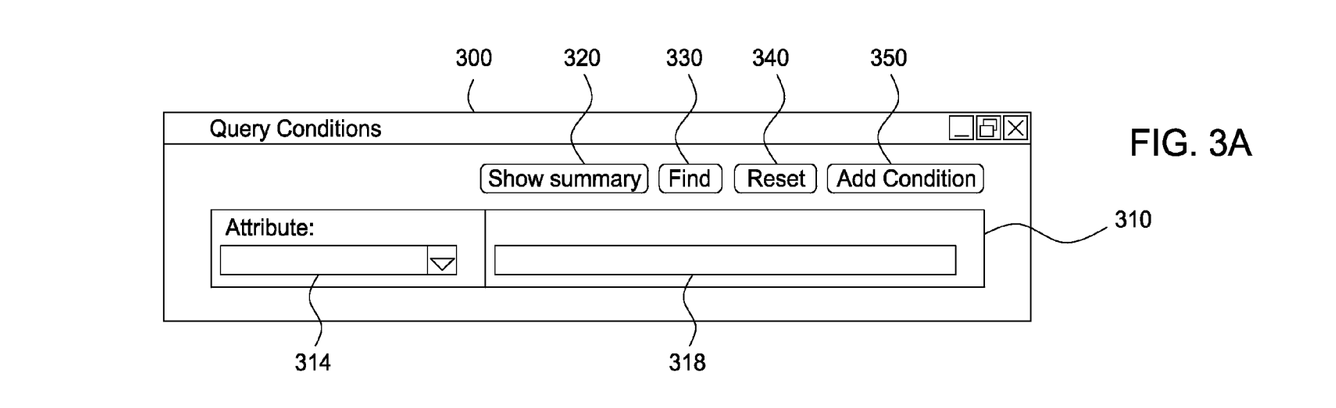
FIGS. 3A-3G illustrate screen shots of an exemplary query interface, according to one embodiment of the invention.

FIGS. 3A-3G, illustrate an interface being used to specify a set of query conditions to include in a database query, according to one embodiment of the invention. As shown in FIG. 3A, the user is presented with a query tool 300, which includes a query condition panel 310. Illustratively, query condition panel 310 includes a pull-down menu 314 used to select a database attribute. The query condition panel 310 also includes a condition value field 318 used to enter a value for a given query condition. Query tool 300 also includes a set of additional control buttons, specifically a "Show summary" button 320 used to activate the display of a query summary; a "Find" button 330 used to activate the execution of the present query; a "Reset" button 340 used to clear the query tool 300 of any previous selections made by the user, and an "Add condition" button 350, which adds a new query condition panel 310 to query tool 300. Of course, the particular selection and arrangement of graphical user interface components may be tailored to suit the needs of an individual case.

Figure 3B:
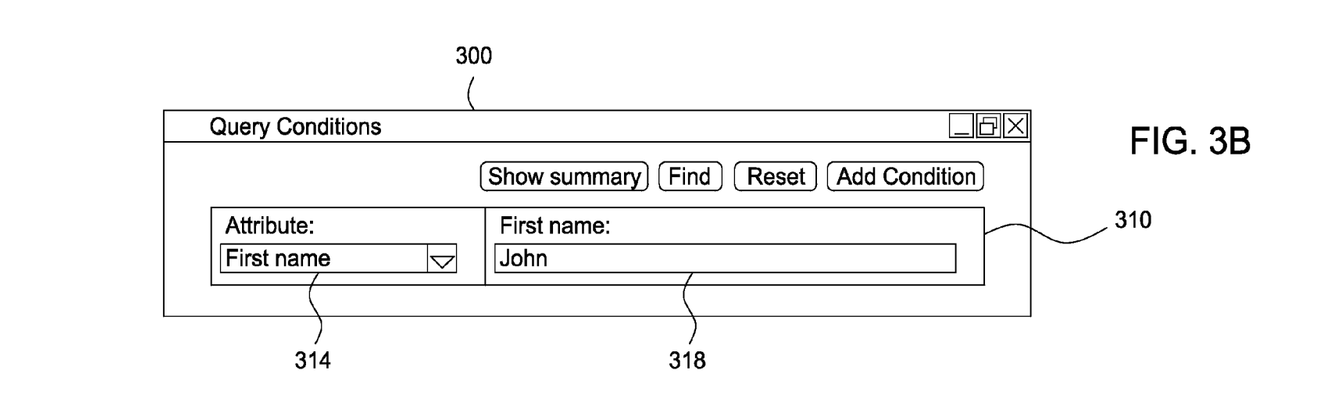

In one embodiment, a user may select pull-down menu 314, and in response, the query tool 108 may be configured to present the user with a list of the attributes that are available in database 140 to include in a query condition. FIG. 3B illustrates query tool 300 of FIG. 3A after the user has selected an attribute of "First name" from pull-down menu 314. In this example, the user has specified the value of "John" in condition value field. If the user selects the "Find" button 330 at this stage, the query tool 300 generates a query using only this single query condition. Since there is a single query condition, neither the grouping of step 210, nor the application of logical operators in steps 220, 230 of method 200 apply in this case. An example database query generated from this single condition is shown in the following:

```
Select all where:
(First name="John")
```

Figure 3C:
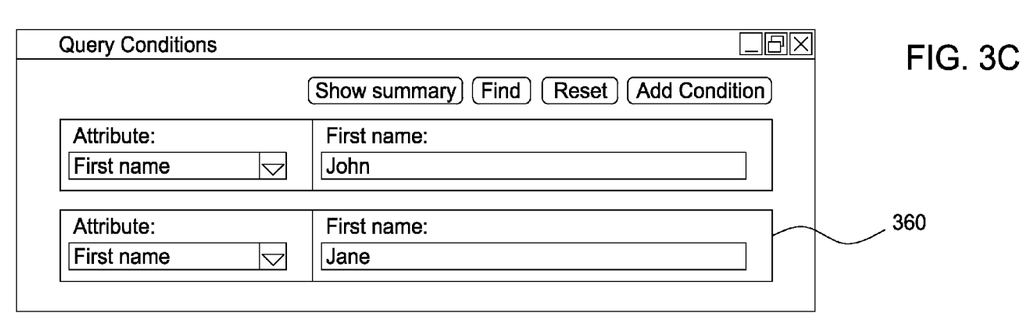

However, the user may continue to interact with query tool 108 to specify additional query conditions. FIG. 3C illustrates the query tool 300 after the user has selected "Add condition" button 350, resulting in the addition of a query condition panel 360 to query tool 300. As shown, the user has selected an attribute of "First name" from pull-down menu 314. Also, the user has entered a value of "Jane" in the condition value field of query condition panel 360. If the user selects "Find" button 330 at this stage, query tool 300 generates a query using both of these query conditions. Since both query conditions are for attribute "First name," these two conditions may be grouped together (step 210 of method 200). Query tool 300 then adds the logical operator "OR" between the two query conditions of the "First name" group (step 220 of method 200). An example database query generated from these two conditions is shown in the following:

```
Select all where:
(First name = "John" OR First name = "Jane")
```

Thus, the set of records returned from this query would include all database records with a first name of "John" and all database records with a first name of "Jane."

Figure 3D:
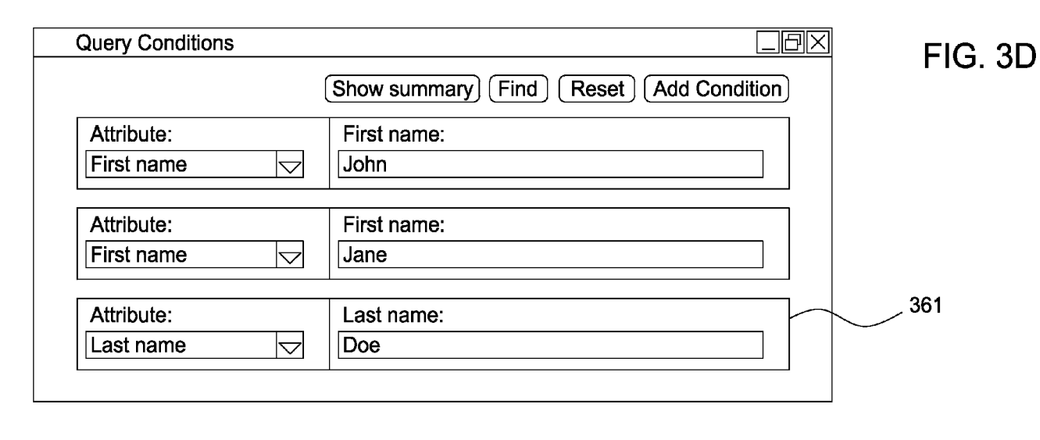

FIG. 3D illustrates the query tool 300 of FIG. 3C after the user has again selected "Add condition" button 350, resulting in the addition of a query condition panel 361 to query tool 300. As shown, the user has selected an attribute of "Last name" from pull-down menu 314 of query condition panel 361. Also, the user has specified a value of "Doe" in the condition value field of query condition panel 361. If the user selects "Find" button 330 at this stage, query tool 300 generates a query using all three of these query conditions. Because, the query conditions include two types of data attributes; namely a "First name" attribute and a "Last name," attribute. If the query tool 300 is used to construct a query at this stage, "First name" attributes are grouped as above. However, the logical operator "AND" is added between the groups of query conditions (step 230 of method 200). An example database query generated from these three conditions is shown in the following:

```
Select all where:
(First name = "John" OR First name = "Jane")
AND
(Last name = "Doe")
```

The set of records returned from this query would include all database records for customers named John Doe and all database records for customers named Jane Doe.

Figure 3E:
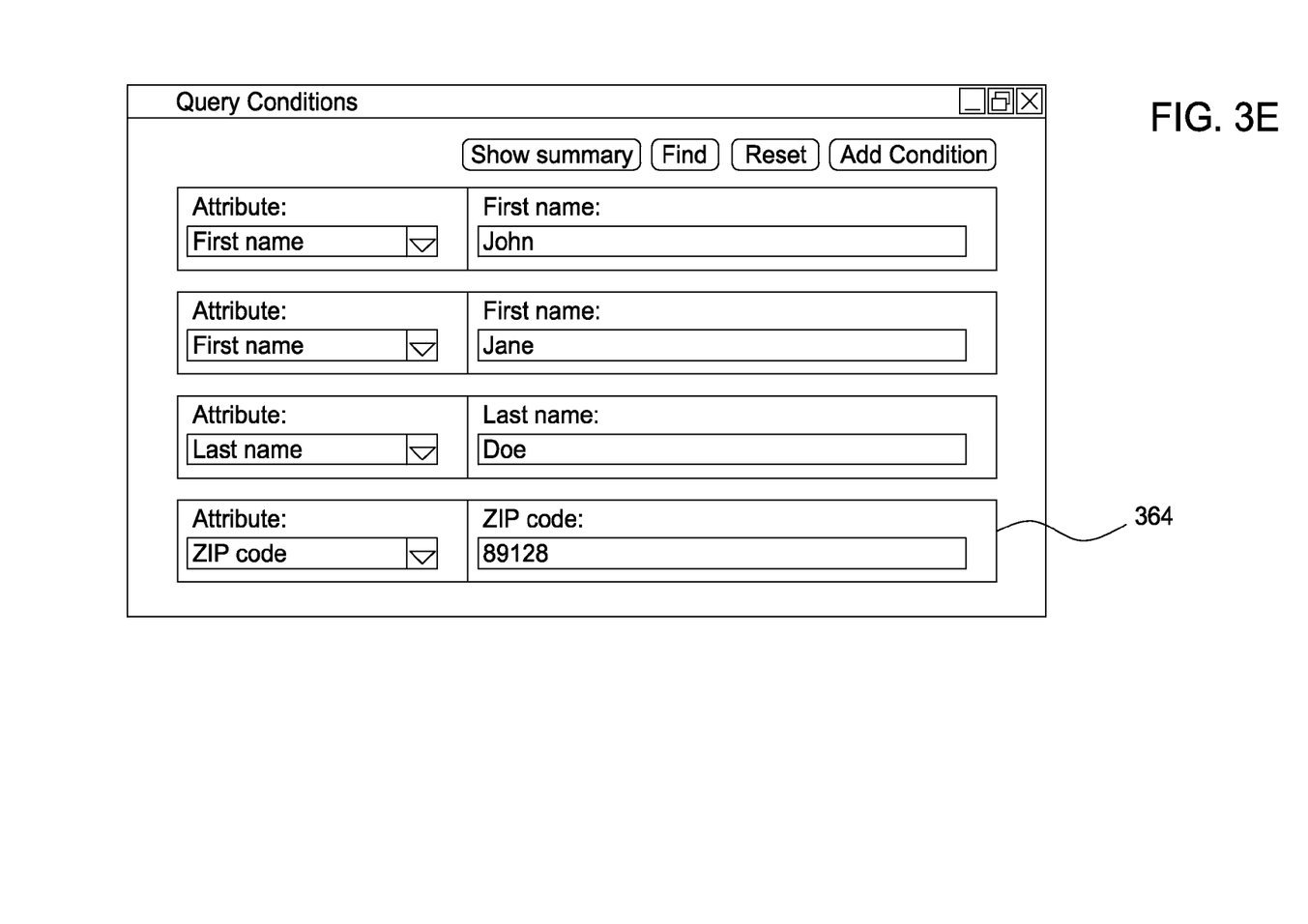

FIG. 3E illustrates the query tool 300 of FIG. 3D after the user has yet again selected "Add condition" button 350, resulting in the addition of a query condition panel 364 to query tool 300. As shown, the user has selected an attribute of "ZIP code" from pull-down menu 314 of query condition panel 364. Also, the user has specified a value of "89128" in condition value field. Thus, at this stage the example query includes four different types of data attributes. The conditions for each group are "ORed" together (step 220 of method 200) and the three groups are "ANDed" together (step 230 of method 200) to compose a database query from these four conditions. An example database query generated from these four conditions is shown in the following:

```
Select all where:
(First name = "John" OR First name = "Jane")
           AND
    (Last name = "Doe")
           AND
    (ZIP code = "89128")
```

The set of records returned would include database records for all customers in ZIP code 89128 who are named either John Doe or Jane Doe.

Figure 3F:
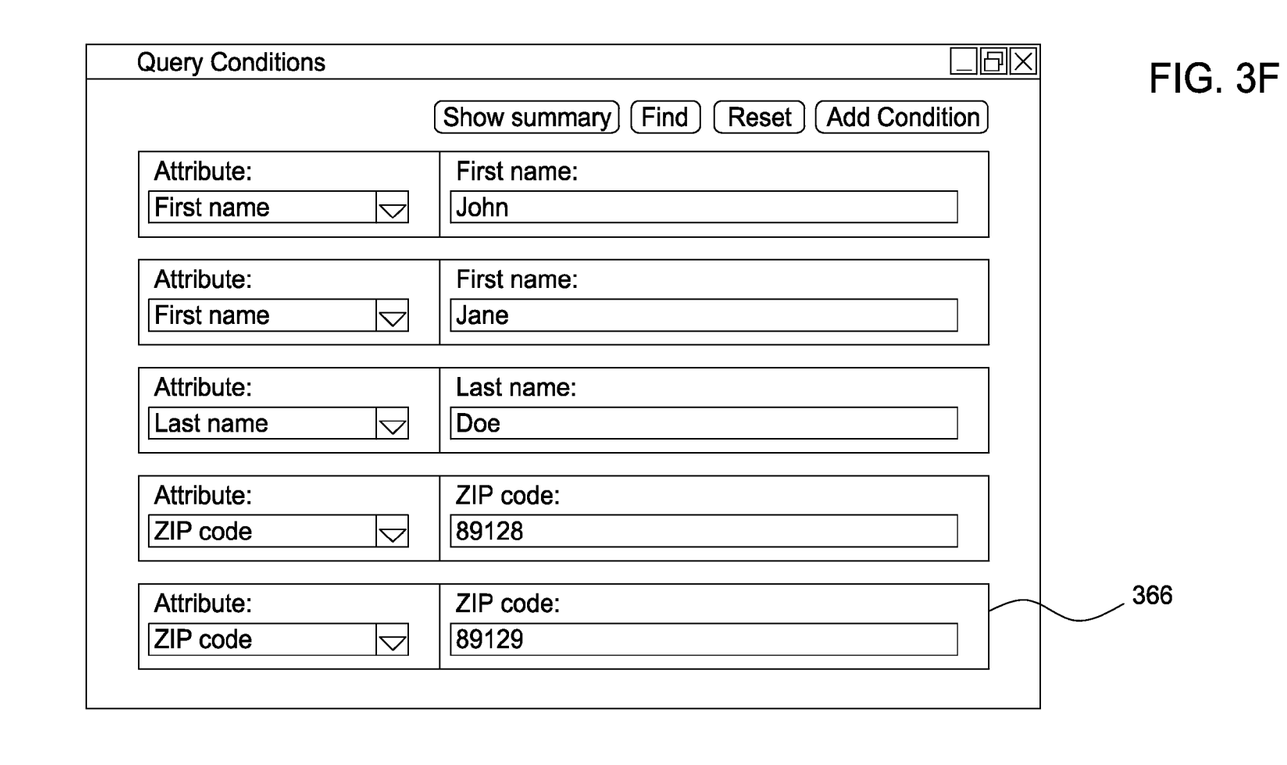

FIG. 3F illustrates the query tool 300 of FIG. 3E after the user has yet again selected "Add condition" button 350, resulting in the addition of a query condition panel 366 to query tool 300. As shown, the user has selected an attribute of "ZIP code" from pull-down menu 314 of query condition panel 366. Also, the user has specified a value of "89129" in condition value field of query condition panel 366. Thus, at this stage the example query includes five different types of data attributes. These attributes are "ANDed" and "ORed" as described above. An example database query generated from these four conditions is shown in the following:

```
Select all where:
(First name = "John" OR First name = "Jane")
           AND
    (Last name = "Doe")
           AND
(ZIP code = "89128" OR ZIP code = "89129")
```

The set of records returned from this query would comprise all database records for customers in ZIP codes 89128 and 89129 who are named either John Doe or Jane Doe.

Figure 3G:
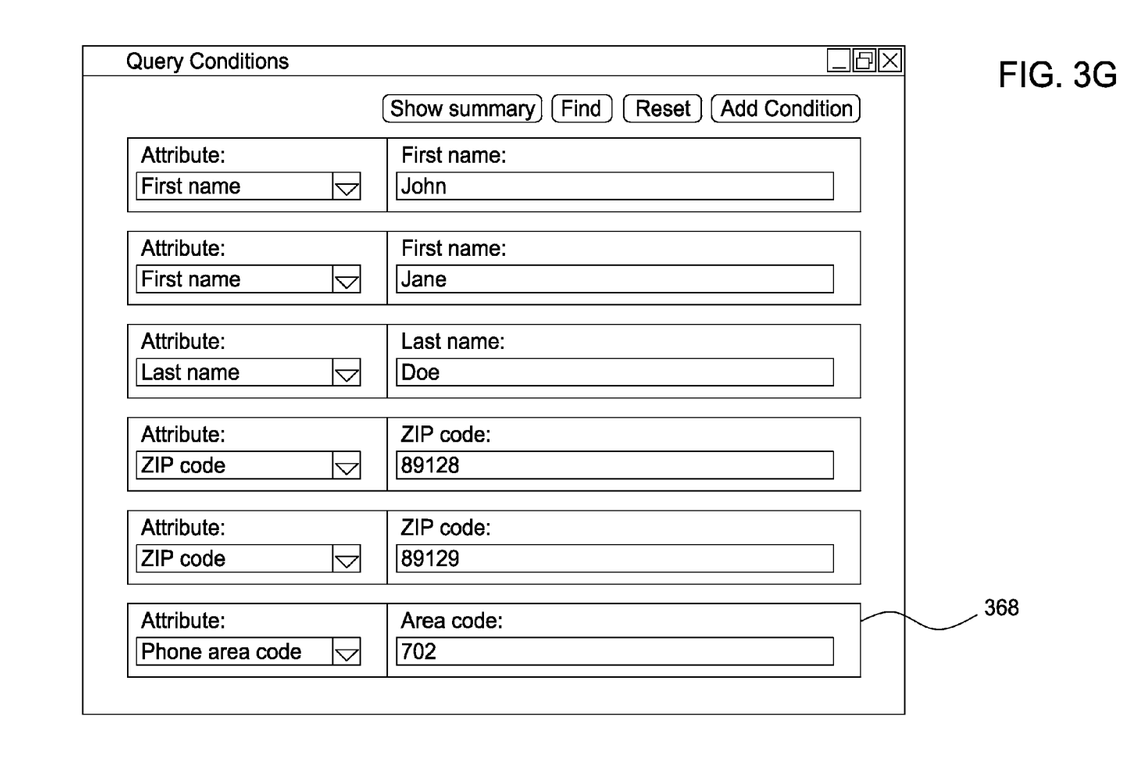

FIG. 3G illustrates the query tool 300 of FIG. 3F after the user has yet again selected "Add condition" button 350, resulting in the addition of a query condition panel 368 to query tool 300. As shown, the user has selected an attribute of "Phone area code" from pull-down menu 314 of query condition panel 368. Also, the user has specified a value of "702" in the condition value field of query condition panel 368. In this example, query tool 300 would build a query which included four different groups of conditions (step 210 of method 200); namely, a different group for each of the "First name," "Last name," "ZIP code," and "Phone area code" attributes specified in the conditions specified in FIGS. 3A-3G. Query tool 300 joins for the attribute of "First name" using the logical operator "OR" (step 220 of method 200). Similarly, the conditions specified for attribute "ZIP code" are connected using the logical operator "OR." Query tool 300 would use the logical operator "AND" to connect each of the four groups of query conditions (step 230 of method 200). An example database query generated from these four conditions is shown in the following:

```
Select all where:
(First name = "John" OR First name = "Jane")
           AND
    (Last name = "Doe")
           AND
(ZIP code = "89128" OR ZIP code = "89129")
           AND
    (Area Code = "702")
```

The set of records returned from this query would comprise all database records for customers in ZIP codes 89128 and 89129 who are named either John Doe or Jane Doe, and having a phone number with an area code of 702.

Although the examples described above have used complete data values for a query condition, one of ordinary skill in the art will understand that query conditions need not be complete. In one embodiment, a conditional value may provide a "starts with" value for comparison. For example, a "starts with" value of "Bra" for a first name field would match database records of both "Brad" and "Bradley."

Figure 4:
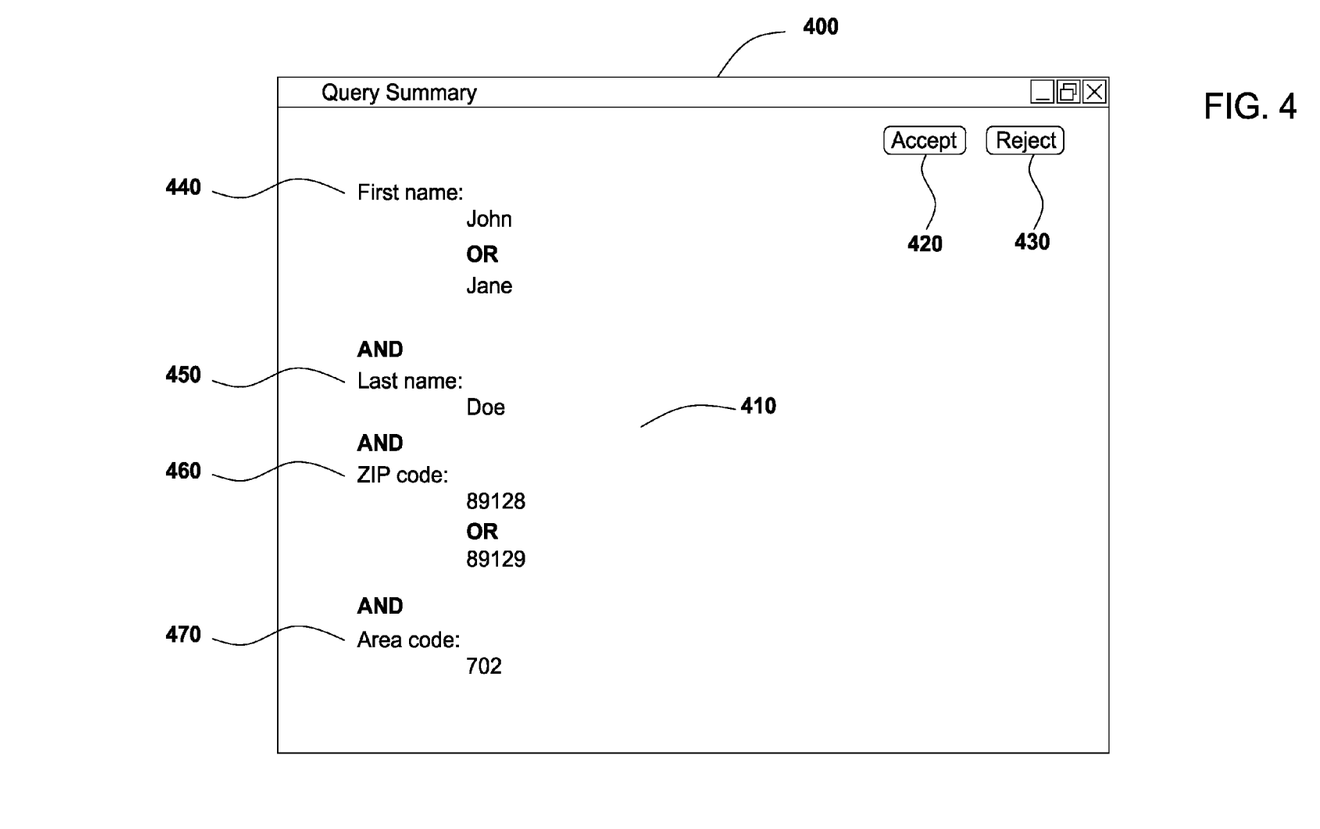
FIG. 4 illustrates a screen shot of the summary view of an exemplary query interface, according to one embodiment of the invention.

FIG. 4 illustrates a screen shot showing an exemplary query interface, according to one embodiment of the invention. As shown, a proposed query solution 410 is presented to the user in query summary 400. Illustratively, proposed query solution 410 corresponds to the query built up over FIGS. 3A-3G. As shown, the query conditions of proposed query solution 410 are grouped into groups 440, 450, 460, 470, with each group connected using the logical operator "AND." Further, the query conditions in group 440 are connected using the logical operator "OR," as are the query conditions in group 460. After evaluating query summary 400, the user can either accept the proposed query solution 410 by selecting "Accept" button 420, or reject the proposed query solution 410 by selecting "Reject" button 430.

Advantageously, embodiments of the present invention enable a non-technical user to define queries having multiple query conditions without being skilled in the particulars of Boolean logic, and conditional predicate logic, or the precedence rules of a given query language. Specifically, a user may specify query conditions without having to provide the logical operators or the query structure needed to compose the query desired by a user. The proposed query solution provided by embodiments of the invention will be correctly structured to meet the requirements of the majority of non-technical users. However, since the proposed query solution may not be correct in every situation, in one embodiment, the user may be presented with a query summary for approval. If the proposed query solution is not adequate, the user may reject it, and could define a new query by an alternate method.

It should be noted that any reference herein to particular values, definitions, programming languages and examples is merely for purposes of illustration. Accordingly, the invention is not limited by any particular illustrations and examples. Additionally, while the foregoing is directed to embodiments of the present invention, other and further embodiments of the invention may be devised without departing from the basic scope thereof, and the scope thereof is determined by the claims that follow.

What is claimed is:

1. A computer-implemented method for a query tool having distinct graphical user interfaces, to automatically determine groupings, Boolean operators, and operator precedence to use in generating a database query, the computer-implemented method comprising:

providing the distinct graphical user interfaces, which comprise a composition interface and an approval interface, the composition interface including a first control comprising an add-condition button to add a new query condition to include in the database query, the composition interface further including a second control comprising a summary button to cause output, via the approval interface, of the proposed database query for approval, the approval interface including a third control comprising an accept button to accept the proposed database query for execution, wherein the approval interface is output only upon activation of the summary button, wherein the composition interface is output prior to activation of the summary button;

receiving, via at least the add-condition button of the composition interface, input specifying a plurality of query conditions to include in the database query to be generated, wherein each query condition specifies: (i) a database field specifying a column of an underlying table of a plurality of underlying tables in a relational database; (ii) a comparison operator; and (iii) a comparison value;

responsive to activation of the summary button of the composition interface, automatically grouping the plurality of query conditions into one or more groups of query conditions by the query tool even in absence of user input explicitly specifying how to group the plurality of query conditions, wherein each group includes query conditions specifying the same database field, wherein each of the plurality of query conditions is to be included in a database query to be generated by assigning a set of Boolean operators to connect the query conditions in each of the one or more groups and to connect each of one or more groups of the query conditions;

defining a set of rules including: (i) a first rule specifying to automatically connect different query conditions within each group using a first specified operator; and (ii) a second rule specifying to automatically connect different groups of query conditions using a second specified operator;

subsequent to automatically grouping the plurality of query conditions, generating a proposed database query by operation of one or more computer processors when executing the query tool, by automatically connecting the grouped query conditions based on the defined set of rules, including: (i) connecting different query conditions within each group using the first specified operator; and (ii) connecting different groups of query conditions using the second specified operator; thereby automatically determining Boolean operators and operator precedence for the proposed database query;

outputting, by the query tool via the approval interface, the proposed database query including the first specified operator connecting different conditions within each group of query conditions and further including the second specified operator connecting different groups of query conditions; and subsequent to activation of the accept button of the approval interface, causing execution of the database query to obtain a set of query results satisfying the set of query conditions, whereafter the set of query results is output by the query tool;

wherein the first specified operator comprises a logical "OR" operator, wherein the second specified operator comprises a logical "AND" operator.

2. The computer-implemented method of claim 1, wherein the database query is generated using the Structured Query Language (SQL) query language.

3. The computer-implemented method of claim 1, wherein the query tool is operatively connected to a database management system that has a query engine component configured to execute the modified database query to obtain the set of query results satisfying the set of query conditions, wherein the approval interface further includes a fourth control to reject execution of the proposed database query, wherein responsive to activation of the fourth control of the approval interface, the database query is not executed, wherein the computer-implemented method further comprises:

subsequent to outputting the proposed database query, and responsive to receiving a request specifying at least a first modification to the proposed database query, modifying the proposed database query based on at least the first specified modification, wherein the proposed database query is modifiable by: (i) removing at least one condition from one of the groups of query conditions; (ii) moving at least one condition from a first one of the groups to a second one of the groups; (iii) changing the first specified operator to the second specified operator; and (iv) changing the second specified operator to the first specified operator.

4. The computer-implemented method of claim 3, wherein the groups of query conditions are connected using a logical "AND" operator based on relationships between the plurality of underlying tables in the relational database, wherein the plurality of query conditions includes:

(i) multiple query conditions pertaining to a first-name attribute and each specifying a different first name;
(ii) multiple query conditions pertaining to a last-name attribute and each specifying a different last name;
(iii) multiple query conditions pertaining to a zone improvement plan (ZIP)-code attribute and each specifying a different ZIP code; and
(iv) multiple query conditions pertaining to a phone-area-code attribute and each specifying a different phone area code.

5. The computer-implemented method of claim 4, wherein the first and second specified operators are distinct operators, wherein each of: (i) different query conditions within each group and (ii) different groups of query conditions are connected with a respective one of the first and second specified operators, even in absence of user input explicitly specifying any logical operator, wherein the proposed database query is modified by, in respective instances:

(i) removing at least one condition from one of the groups of query conditions;
(ii) moving at least one condition from a first one of the groups to a second one of the groups;
(iii) changing one of the logical "OR" operators to a logical "AND" operator; and
(iv) changing one of the logical "AND" operators to a logical "OR" operator.

6. The computer-implemented method of claim 5, wherein the proposed database query is modified by, in a given instance:

(i) removing at least one condition from one of the groups of query conditions;
(ii) moving at least one condition from a first one of the groups to a second one of the groups;
(iii) changing one of the logical "OR" operators to a logical "AND" operator; and
(iv) changing one of the logical "AND" operators to a logical "OR" operator;

wherein the composition interface further includes:
a find button to activate finding of search results from executing the proposed database query; and
a reset button to clear the query tool of the query conditions of the proposed database query;
wherein the fourth control comprises a reject button to reject execution of the proposed database query.

7. A computer program product comprising a non-transitory computer-readable medium having a query tool including distinct graphical user interfaces, the query tool executable to perform an operation to automatically determine groupings, Boolean operators, and operator precedence to use in generating a database query, the operation comprising:

provi­ding the distinct graphical user interfaces, which comprise a composition interface and an approval interface, the composition interface including a first control comprising an add-condition button to add a new query condition to include in the database query, the composition interface further including a second control comprising a summary button to cause output, via the approval interface, of the proposed database query for approval, the approval interface including a third control comprising an accept button to accept the proposed database query for execution, wherein the approval interface is output only upon activation of the summary button, wherein the composition interface is output prior to activation of the summary button;

receiving, via at least the add-condition button of the composition interface, input specifying a plurality of query conditions to include in the database query to be generated, wherein each query condition specifies: (i) a database field specifying a column of an underlying table of a plurality of underlying tables in a relational database; (ii) a comparison operator; and (iii) a comparison value;

responsive to activation of the summary button of the composition interface, automatically grouping the plurality of query conditions into one or more groups of query conditions by the query tool even in absence of user input explicitly specifying how to group the plurality of query conditions, wherein each group includes query conditions specifying the same database field, wherein each of the plurality of query conditions is to be included in a database query to be generated by assigning a set of Boolean operators to connect the query conditions in each of the one or more groups and to connect each of one or more groups of the query conditions;

defining a set of rules including: (i) a first rule specifying to automatically connect different query conditions within each group using a first specified operator; and (ii) a second rule specifying to automatically connect different groups of query conditions using a second specified operator;

subsequent to automatically grouping the plurality of query conditions, generating a proposed database query by operation of one or more computer processors when executing the query tool, by automatically connecting the grouped query conditions based on the defined set of rules, including: (i) connecting different query conditions within each group using the first specified operator; and (ii) connecting different groups of query conditions using the second specified operator; thereby automatically determining Boolean operators and operator precedence for the proposed database query;

outputting, by the query tool, the proposed database query including the first specified operator connecting different conditions within each group of query conditions and further including the second specified operator connecting different groups of query conditions; and subsequent to activation of the accept button of the approval interface, causing execution of the database query to obtain a set of query results satisfying the set of query conditions, whereafter the set of query results is output by the query tool;

wherein the first specified operator comprises a logical "OR" operator, wherein the second specified operator comprises a logical "AND" operator.

8. The computer program product of claim 7, wherein the database query is generated using the Structured Query Language (SQL) query language.

9. A system for a query tool having distinct graphical user interfaces, to perform an operation to automatically determine groupings, Boolean operators, and operator precedence to use in generating a database query, the system comprising:

one or more computer processors;

a memory containing the query tool which, when executed by the one or more computer processors, performs an operation comprising:

providing the distinct graphical user interfaces, which comprise a composition interface and an approval interface, the composition interface including a first control comprising an add-condition button to add a new query condition to include in the database query, the composition interface further including a second control comprising a summary button to cause output, via the approval interface, of the proposed database query for approval, the approval interface including a third control comprising an accept button to accept the proposed database query for execution, wherein the approval interface is output only upon activation of the summary button, wherein the composition interface is output prior to activation of the summary button;

receiving, via at least the add-condition button of the composition interface, input specifying a plurality of query conditions to include in the database query to be generated, wherein each query condition specifies: (i) a database field specifying a column of an underlying table of a plurality of underlying tables in a relational database; (ii) a comparison operator; and (iii) a comparison value;

responsive to activation of the summary button of the composition interface, automatically grouping the plurality of query conditions into one or more groups of query conditions by the query tool even in absence of user input explicitly specifying how to group the plurality of query conditions, wherein each group includes query conditions specifying the same database field, wherein each of the plurality of query conditions is to be included in a database query to be generated by assigning a set of Boolean operators to connect the query conditions in each of the one or more groups and to connect each of one or more groups of the query conditions;

defining a set of rules including: (i) a first rule specifying to automatically connect different query conditions within each group using a first specified operator; and (ii) a second rule specifying to automatically connect different groups of query conditions using a second specified operator;

subsequent to automatically grouping the plurality of query conditions, generating, by the query tool, a proposed database query by automatically connecting the grouped query conditions based on the defined set of rules, including: (i) connecting different query conditions within each group using the first specified operator; and (ii) connecting different groups of query conditions using the second specified operator; thereby automatically determining Boolean operators and operator precedence for the proposed database query;

outputting, by the query tool via the approval interface, the proposed database query including the first specified operator connecting different conditions within each group of query conditions and further including the second specified operator connecting different groups of query conditions; and subsequent to activation of the accept button of the approval interface, causing execution of the database query to obtain a set of query results satisfying the set of query conditions, whereafter the set of query results is output by the query tool;

wherein the first specified operator comprises a logical "OR" operator, wherein the second specified operator comprises a logical "AND" operator.

10. The system of claim 9, wherein the database query is generated using the Structured Query Language (SQL) query language.

11. The computer-implemented method of claim 1, wherein the first rule specifies to connect the query conditions within each group using a logical "OR" operator without requiring user input explicitly specifying any logical "OR" operator to connect with.

12. The computer-implemented method of claim 1, wherein the second rule specifies to connect the groups of query conditions using a logical "AND" operator without requiring user input explicitly specifying any logical "AND" operator to connect with.

13. The computer-implemented method of claim 1, wherein the proposed database query is modified by moving at least one condition from a first one of the groups to a second one of the groups.

14. The computer program product of claim 7, wherein the query tool is operatively connected to a database management system that has a query engine component configured to execute the modified database query to obtain the set of query results satisfying the set of query conditions.

15. The computer program product of claim 7, wherein the first rule specifies to connect the query conditions within each group using a logical "OR" operator without requiring user input explicitly specifying any logical "OR" operator to connect with.

16. The computer program product of claim 7, wherein the second rule specifies to connect the groups of query conditions using a logical "AND" operator without requiring user input explicitly specifying any logical "AND" operator to connect with.

17. The computer program product of claim 7, wherein the proposed database query is modified by moving at least one condition from a first one of the groups to a second one of the groups.

18. The system of claim 9, wherein the first rule specifies to connect the query conditions within each group using a logical "OR" operator without requiring user input explicitly specifying any logical "OR" operator to connect with.

19. The system of claim 9, wherein the second rule specifies to connect the groups of query conditions using a logical "AND" operator without requiring user input explicitly specifying any logical "AND" operator to connect with.

20. The computer-implemented method of claim 1, wherein the composition interface further includes:
a find button to activate finding of search results from executing the proposed database query; and
a reset button to clear the query tool of the query conditions of the proposed database query.

21. The computer-implemented method of claim 20, wherein the approval interface further includes a reject button to reject execution of the proposed database query.

* * * * *